United States Patent [19]

McDonald et al.

[11] Patent Number: 4,684,052

[45] Date of Patent: Aug. 4, 1987

[54] METHOD OF BRAZING CARBIDE USING COPPER-ZINC-MANGANESE-NICKEL ALLOYS

[75] Inventors: Allen S. McDonald, Bridgeport, Conn.; Charles W. Philp, New York; Thomas A. Sperakis, E. Elmhurst, both of N.Y.

[73] Assignee: Handy & Harman, New York, N.Y.

[21] Appl. No.: 909,647

[22] Filed: Sep. 22, 1986

Related U.S. Application Data

[62] Division of Ser. No. 734,944, May 16, 1985, Pat. No. 4,631,171.

[51] Int. Cl.$^4$ .......................... B23K 1/04; B23K 35/30
[52] U.S. Cl. .................................................... 228/122
[58] Field of Search ........... 228/121, 122, 124, 263.12, 228/263.11

[56] References Cited

U.S. PATENT DOCUMENTS

| | | | |
|---|---|---|---|
| Re. 17,631 | 4/1930 | Lytle | 420/473 |
| 1,350,166 | 8/1920 | Milliken | 420/481 |
| 1,762,871 | 6/1930 | Lytle | 428/616 |
| 1,826,239 | 10/1931 | Cheetham | 420/475 |
| 2,028,317 | 1/1936 | Butterbaugh | 219/8 |
| 2,312,109 | 2/1943 | McDonald et al. | 219/8 |
| 3,156,589 | 11/1964 | Klement | 148/3 |
| 3,234,014 | 2/1966 | McLain et al. | 420/481 |
| 3,403,997 | 10/1968 | Badia | 420/479 |
| 3,778,238 | 12/1973 | Tyler et al. | 29/196.3 |
| 3,982,933 | 9/1976 | Rudolph et al. | 420/475 |
| 4,003,715 | 1/1977 | CasCone | 420/481 |
| 4,067,752 | 1/1978 | Brook et al. | 148/11.5 |
| 4,113,474 | 9/1978 | Okano | 420/475 |
| 4,169,729 | 10/1979 | Popplewell et al. | 420/471 |
| 4,389,074 | 6/1983 | Greenfield | 299/79 |
| 4,426,033 | 1/1984 | Mizuhara | 228/122 X |

FOREIGN PATENT DOCUMENTS 1072644  6/1967  United Kingdom .

OTHER PUBLICATIONS

Handy & Harman Technical Data Sheet–Number D–61 "Information About Handy Hi–Temp 095".
Handy & Harman Technical Data Sheet–Number D–74 "Information About Handy Hi–Temp 548 & Handy Hi–Temp Trimet 549".
F. N. Ginzburg, et al., "New Copper Based Brazing Alloys for Use on Cemented Carbide Tools" (1975).

*Primary Examiner*—Kenneth J. Ramsey
*Attorney, Agent, or Firm*—Pennie & Edmonds

[57] ABSTRACT

Copper-zinc-manganese-nickel alloys comprising 30 to 70 weight percent copper, 15 to 45 weight percent zinc, 5 to 20 weight percent manganese, 1 to 20 weight percent nickel, 0.05 to 2 weight percent silicon and less than about 0.05 weight percent of other elements. Also, use of this alloy as a brazing material and a method for brazing carbide compounds to a suitable substrate utilizing such brazing materials.

17 Claims, No Drawings

METHOD OF BRAZING CARBIDE USING COPPER-ZINC-MANGANESE-NICKEL ALLOYS

This is a division of application Ser. No. 734,944 filed May 16, 1985, now U.S. Pat. No. 4,631,171.

TECHNICAL FIELD

The invention relates to copper-zinc alloys and, more particular, to copper-zinc-manganese-nickel alloys for use as brazing materials.

BACKGROUND ART

As a material of construction, copper and copper alloys constitute one of the major groups of commercial metals. They are widely used due to their combination of physical properties which include electrical conductivity, thermal conductivity, corrosion resistance, machinability, fatigue characteristics, workability, formability, and strength. In addition, copper alloys can be made in a variety of colors, are non-magnetic, and can be finished by plating or lacquering. Most copper alloys can be welded, brazed or soldered with little difficulty.

To improve certain of these basic properties, the various alloying elements can be selected. Zinc has been found to be a particularly useful element and a number of commercial copper-zinc alloys include the family of brasses. Yellow brass for example, an alloy of 65% copper 35% zinc is useful due to its golden color and good workability. Due to its relatively low melting temperature and compatibility with most steels and copper alloys, the brasses were also used as brazing alloys to join these different base metals together. Today there are a multitude of copper-zinc base brazing alloys containing a wide variety of additional alloying elements for particular applications.

One particularly effective elemental additive is nickel, and the family of copper-zinc-nickel alloys are known as the nickel-silvers due to their whitish appearance. Typical compositions of nickel-silver alloys range from 55–65% copper, 17–27% zinc and 15–20% nickel. While having a higher melting temperature than the brasses, the nickel-silvers provide compatibility with a number of other materials, such as tungsten carbide, and also provide higher strength.

A very popular family of brazing alloys include those containing silver. Such silver-copper-zinc (and optional nickel) brazing alloys have been used for joining carbide compounds to various substrates because of their relatively low melting temperatures (approximately 550°–750° C.). While these alloys exhibit good bonding strength, sufficient plasticity and highly preferred brazing temperatures, they are expensive due to the silver content. Also, higher joint strengths and better high temperature properties are desireable. Therefore, substitute alloys have traditionally been sought by those skilled in the art for brazing carbide components to various substrates.

One family of alloys which has been suggested as substitute for such silver-base or nickel-silver alloys is the copper-nickel-manganese-family. Typically, such alloys contain about 50–55% copper, 8–11% nickel and the balance manganese. These brazing alloys are relatively free flowing and compatible with various carbides and base metals such as cast irons, steels and tool steels as well as some stainless steels and nickel-base alloys. However, since zinc is not included in this family of alloys, the alloy melting temperature ranges from about 850° C. to about 930° C. Therefore, brazing temperatures on the order of about 950° to 1050° C. are required to produce suitably brazed joints.

Applicants now have found, however, that copper-zinc-manganese-nickel alloys provide compatibility with a variety of carbide compounds and substrates, and comparable strengths and fluidity in comparison to the copper-manganese-nickel alloys of the prior art while decreasing the brazing temperature to a lower range. In comparison to silver alloys, the alloys of the present invention provide improved strengths at much lower cost in addition to providing compatibility with a wide range of carbide compounds and substrates.

SUMMARY OF THE INVENTION

The invention relates to a copper alloy composition essentially about 30 to 70 weight percent copper, about 15 to 45 weight percent zinc, about 5 to 20 weight percent manganese, about 1 to 20 weight percent nickel, and about 0.05 to 2 weight percent silicon. Other elements can be present in small amounts, generally less than 0.5 weight percent. The total of such other elements should be less than about 3 weight percent.

Preferably, the copper content is about 35 to 60 weight percent, the zinc content is about 15 to 40 weight percent, the manganese content of about 5 to 15 weight percent, the nickel content is about 5 to 15 weight percent. In all these alloys, a preferred silicon content is about 0.05 to 0.25 weight percent.

One particular alloy family includes those having a the copper content of about 50 to 60 weight percent, a zinc content of about 20 to 30 weight percent, a manganese content of about 10 to 14 weight percent, a nickel content of about 6 to 10 weight percent and a silicon content of about 0.05 to 0.25 weight percent. Specifically, this alloy contains about 53 to 57 weight percent copper, about 23 to 27 weight percent zinc, about 11 to 13 weight percent manganese, about 7 to 9 weight percent nickel, and about 0.05 to 0.25 weight percent silicon. These alloys have a solidus temperature of about 1575° F. (857° C.) and a liquidus temperature of about 1675° F. (913° C.).

Another group of alloys which are suitable according to the invention have a copper content of about 40 to 50 weight percent, a zinc content of about 30 to 40 weight percent, a manganese content of about 6 to 10 weight percent, a nickel content of about 10 to 14 weight percent and a silicon content of about 0.05 to 0.25 weight percent. Specifically, this alloy includes about 43 to 47 weight percent copper, about 33 to 37 weight percent zinc, about 7 to 9 weight percent manganese, about 11 to 13 weight percent nickel, and about 0.05 to 0.25 weight percent silicon. These alloys have a solidus temperature of about 1610° F. (877° C.) and a liquidus temperature of about 1670° F. (910° C.).

The invention also relates to the use of these alloys as brazing products in the form of wire, strip, powder, or paste. Alternately, a brazing product comprising a layer of copper or copper-nickel alloy strip sandwiched between two layers of the copper alloy compositions of the invention can be utilized. The relative amounts of each layer in these brazing product range between about 1:2:1 to 1:4:1.

The invention also relates to a method for joining a carbide compound to a suitable substrate which comprises providing a copper brazing alloy according to the invention and brazing the carbide. This method is useful for substrates of carbon or low alloy steel, tool steel, stainless steel or a copper or nickel alloy having a higher melting point than the brazing alloy. Any carbide compound such as tungsten carbide, silicon carbide, vanadium carbide, tantalum carbide, titanium carbide or the like, can be used. This method is useful when furnace, induction, resistance, or oxygen gas torch heating is used to heat the substrate and carbide compound to the proper brazing temperature range.

DESCRIPTION OF PREFERRED EMBODIMENTS

For joining a carbide insert to a suitable substrate, such as a tool steel, for use on mining, construction, and machining bits or saw blades, the following method would be used for brazing the parts together.

The substrate, carbide and braze metal are prepared for brazing in such a manner as to avoid contamination of the joint. The surfaces to be brazed are coated with a brazing flux which remains active to at least 2200° F. (1205° C.). Such as Handy & Harman High Temp M Flux. The components can be joined together by a number of different procedures, all which require the parts to be heated to a temperature of approximately at least about 1750° F. (955° C.). The heating time would vary depending upon the specific procedure used. In each case, a joint clearance of between 0.002 and 0.005 inches is desired to produce optimum properties of the brazed assembly.

One method for completing the brazed joint is to use an alloy having a composition of 55 weight percent copper, 12 weight percent manganese, 8 weight percent nickel, 0.15 weight percent silicon and the balance being essentially zinc. This alloy is then manufactured in the form of a wire having a diameter of approximately 1/16 of an inch.

The parts to be joined are cleaned and fluxed as described above, and then heated with an oxygen acetylene torch to the necessary brazing temperature range. The rod is applied by touching it to the parts to be joined. When the parts achieve the proper temperature, the rod becomes liquid and flows between the parts. After the alloy flows completely between the parts to be joined, the heat is removed and the assembly is allowed to cool to room temperature.

In another embodiment of the invention, an alloy having a composition of about 45% copper, 8% manganese, 12% nickel and 0.15 percent silicon with the balance being essentially zinc is formed into a brazing product by rolling two layers of this alloy in the form of strip onto each side of a layer of copper. The rolling is completed until the thickness of the clad layer is about 0.0025 for each of the two layers of braze alloy strip according to the invention and 0.005 for the pure copper core. Thus, the overall thickness of this tri-layer braze product is approximately 0.010 inches. This product is then cut to conform to the shape of the tungsten carbide insert, and placed between the carbide and substrate to which it is to be joined. In this case, 8740 low alloy steel is used as the substrate. The parts and filler metal are cleaned as described above and the braze surfaces are coated with the high temperature brazing flux. The parts are then heated by induction until flow of the filler metal occurs. A heating time of approximately 15 seconds is desirable and again the temperature in the joint area attains approximately 1750° F. (955° C.).

Shear strength values of tungsten carbide/8740 steel at ambient temperatures are suitable for the intended applications. Performance life tests have exceeded those of copper-nickel-manganese or copper-nickel-zinc alloys. No embrittlement or joint cracking was found under the conditions of brazing described above, either immediately after brazing or after final heat treatment.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:
1. A method for joining a carbide compound to a substrate which comprises:
    (a) providing a brazing product having a copper alloy composition consisting essentially of about 43 to 57 weight percent copper, about 23 to 37 weight percent zinc, about 7 to 13 weight percent manganese, about 7 to 13 weight percent nickel, and between about 0.05 and 2 weight percent silicon; and
    (b) brazing the carbide compound to the substrate with said brazing product at a temperature above the liquidus temperature of the copper alloy composition.
2. The method according to claim 1 wherein the substrate is carbon or low alloy steel, tool steel, stainless steel or a copper or nickel alloy having a higher melting point than the brazing alloy.
3. The method according to claim 2 wherein the carbide compound is tungsten carbide, silicon carbide, vanadium carbide, tantalum carbide, or titanium carbide.
4. The method according to claim 3 wherein the brazing temperature is achieved by furnace, induction, resistance or oxygen-gas torch heating.
5. A method for joining carbide compound to a substrate which comprises:
    (a) providing a brazing product having a copper alloy composition consisting essentially of about 45 to 55 weight percent copper, about 25 to 35 weight percent zinc, about 8 to 12 weight percent manganese, about 8 to 12 weight percent nickel and about 0.05 to 2 weight percent silicon; and
    (b) brazing the carbide compound to the substrate with said brazing product at a temperature above the liquidus temperature of the copper alloy composition.
6. The method according to claim 5 wherein said substrate is carbon or low alloy steel, tool steel, stainless steel or a copper or nickel alloy having a higher melting point than the brazing alloy.
7. The method according to claim 6 wherein said carbide compound is tungsten carbide, silicon carbide, vanadium carbide, tantalum carbide or titanium carbide.
8. The method according to claim 7 wherein the brazing temperature is achieved by furnace, induction, resistance or oxygen-gas torch heating.
9. A method for joining a carbide compound to a substrate which comprises:
    (a) providing a brazing product having a copper alloy composition consisting essentially of about 53 to 57 weight percent copper, about 23 to 27 weight percent zinc, about 11 to 13 weight percent manganese, about 7 to 9 weight percent nickel and about 0.05 to 0.25 weight percent silicon; and
    (b) brazing the carbide compound to the substrate with said brazing product at a temperature above the liquidus temperature of the copper alloy composition.

10. The method according to claim 9 wherein said substrate is carbon or low alloy steel, tool steel, stainless steel or a copper or nickel alloy having a higher melting point than the brazing alloy.

11. The method according to claim 10 wherein said carbide compound is tungsten carbide, silicon carbide, vanadium carbide, tantalum carbide or titanium carbide.

12. The method according to claim 11 wherein the brazing temperature is achieved by furnace, induction, resistance or oxygen-gas torch heating.

13. A method for joining a carbide compound to a substrate which comprises:
(a) providing a brazing product having a copper alloy composition consisting essentially of about 43 to 47 weight percent copper, about 33 to 37 weight percent zinc, about 7 to 9 weight percent manganese, about 11 to 13 weight percent nickel and about 0.05 to 0.25 weight percent silicon; and
(b) brazing the carbide compound to the substrate with said brazing product at a temperature above the liquidus temperature of the copper alloy composition.

14. The method according to claim 13 wherein said substrate is carbon or low alloy steel, tool steel, stainless steel or a copper or nickel alloy having a higher melting point than the brazing alloy.

15. The method according to claim 13 wherein said carbide compound is tungsten carbide, silicon carbide, vanadium carbide, tantalum carbide or titanium carbide.

16. The method according to claim 13 wherein the brazing temperature is achieved by furnace, induction, resistance or oxygen-gas torch heating.

17. The method according to any one of claims 1 through 16 which further comprises selecting the copper alloy brazing product in the form of wire; strip; powder; paste; or a three layer laminate comprising a layer of copper or a copper nickel alloy sandwiched between two layers of said copper alloy composition, the relative amounts of each layer ranging between about 1:2:1 to 1:4:1; said product form selected prior to brazing the carbide compound to the substrate.

* * * * *